United States Patent
Geormezi et al.

(10) Patent No.: US 7,842,734 B2
(45) Date of Patent: Nov. 30, 2010

(54) POLY(ARYLENE ETHER) COPOLYMERS CONTAINING PYRIDINE UNITS AS PROTON EXCHANGE MEMBRANES

(75) Inventors: Maria Geormezi, Patras (GR); Valadoula Deimede, Patras (GR); Nora Gourdoupi, Patras (GR); Joannis Kallitsis, Patras (GR)

(73) Assignee: Advent Technologies SA, Marousi Patras (GR)

( * ) Notice: Subject to any disclaimer, the term of this patent is extended or adjusted under 35 U.S.C. 154(b) by 770 days.

(21) Appl. No.: 11/805,812

(22) Filed: May 24, 2007

(65) Prior Publication Data

US 2008/0160378 A1    Jul. 3, 2008

Related U.S. Application Data

(60) Provisional application No. 60/844,260, filed on Sep. 12, 2006.

(51) Int. Cl.
 *C08J 5/20* (2006.01)
(52) U.S. Cl. .................. 521/27; 521/30; 525/327.1; 528/211
(58) Field of Classification Search ............ 521/27, 521/30; 525/327.1; 528/211
See application file for complete search history.

(56) References Cited

FOREIGN PATENT DOCUMENTS

WO    WO2008/090412 A    7/2008

OTHER PUBLICATIONS

International Search Report of Related International Application No. PCT/IB2007/004500 (7 pages).

Written Opinion of Related International Application No. PCT/IB2007/004500 (5 pages).

Pefkianakis et al., "Novel polymer electrolyte membrane, based on pyridine containing poly(ether sulfone), for application in high-temperature fuel cells," Macromolecular rapid communications, 26 (21), 1724-1728 CODEN: MRCOE3; ISSN:1022-1336, Jan. 1, 2005, XP002495312.

Daletou, M.K. et al., "Proton conducting membranes based on blends of PBI with aromatic polyethers containing pyridine units," Journal of Membrane Science, Elsevier Scientific Publishing Company, Amsterdam, NL, vol. 252, No. 1-2, Jan. 1, 2003, pp. 115-122, XP009103762, ISSN:0376-7388.

Kerres, J.A., "Development of ionomer membranes for fuel cells," Journal of Membrane Science, Elsevier Scientific Publishing Company, Amsterdam, NL, vol. 185, Apr. 15, 2001, pp. 3-27, XP002226657, ISSN: 0376-7388.

*Primary Examiner*—Edward J Cain
(74) *Attorney, Agent, or Firm*—Edwards Angell Palmer & Dodge LLP; Peter F. Corless; Lisa Swiszcz

(57) ABSTRACT

The subject invention relates to the development and characterization of a new series of poly (arylene ether) copolymers containing pyridine and biphenyl or hydroquinone moieties. Preferred polymers can exhibit very good mechanical properties, high thermal and oxidative stability and high doping ability with strong acids. The invention further relates to the preparation and application of MEA on PEMFC type single cells.

41 Claims, 6 Drawing Sheets

POLY(ARYLENE ETHER) COPOLYMERS CONTAINING PYRIDINE UNITS AS PROTON EXCHANGE MEMBRANES

CROSS REFERENCE TO RELATED APPLICATION

This application claims priority to and the benefit of Provisional U.S. Application Ser. No. 60/844,260, filed Sep. 12, 2006, the entire contents of which are incorporated herein by reference.

FIELD OF THE INVENTION

In one aspect, the present invention relates to new polymer electrolyte membranes comprising pyridine-based aromatic copolymers containing 4,4'-biphenol and/or hydroquinone moieties. Soluble and high molecular weight copolymers can be obtained, combining high glass transition temperatures and high thermal stability. Moreover, preferred copolymers of the invention can exhibit high oxidative stability, high doping ability with phosphoric acid and high proton conductivity e.g. in the range of $10^{-3}$-$10^{-2}$ S/cm. Preferred polymers of the invention are particularly useful as polymer electrolyte materials for high temperature proton exchange membrane fuel cells.

BACKGROUND OF THE INVENTION

Polymer electrolyte membrane fuel cells (PEMFC) are sustainable, energy efficient, clean and environmental friendly, advanced power systems (Nature, 414 (2001), p. 345. Because of their potential to reduce our dependence on fossil fuels and diminish poisonous emissions to the atmosphere, PEMFCs have emerged as tantalizing alternatives to combustion engines. Using pure hydrogen which appears to be an excellent energy carrier and can be produced from any source by using solar, hydro, biomass, wind, geothermal, etc., PEMFCs are one of the most promising energy technologies under development, producing only water during their operation.

In a PEMFC, the proton exchange membrane (PEM) is the core part of the cell. The crucial properties of a membrane for proton exchange membrane fuel cell (PEMFC) are high proton conductivity, low electronic conductivity, good mechanical properties, oxidative and chemical integrity, low permeability to gases and limited swelling in the presence of water. It is obvious that is imperative the low cost and the capability for fabrication into MEAs.

Membranes commonly used in PEMFC are perfluorinated polymers containing sulfonic acid groups on side chains, like for example Nafion (U.S. Pat. No. 3,692,569), manufactured by DuPont. Such membranes suffer from high cost, low operating temperature and high fuel gas permeability. As a result, they exhibit good performance only at moderate temperatures (less than 90° C.), relative high humidities, and with pure hydrogen gas as fuel. The operation of a fuel cell at elevated temperatures has the benefits of reducing CO poisoning of the platinum electrocatalyst and increased reaction kinetics. That is why so much effort is presently devoted to the development of alternative PEM membranes able to stand higher temperatures. In this respect, new polymeric materials based on aromatic backbones have recently been synthesized in order to replace Nafion. Potential polymers for this aim include polyethersulfones, polyetherketones, polyimides and polybenzimidazoles.

Polymer electrolyte membranes that can be applied in fuel cells operating at temperatures above 120° C. are mostly based in polybenzimidazole (PBI) (U.S. Pat. No. 5,525,436). However, PBI presents moderate mechanical properties and low oxidative stability. These drawbacks in combination with the limited availability and it's high cost result in development of alternative polymeric materials. Various attempts have been made to improve the mechanical properties of PBI by using polymer blends composed of PBI and a thermoplastic elastomer (Macromolecules 2000, 33, 7609, WO Patent 01/18894 A2) in order to combine the acid doping ability of the PBI with the exceptional mechanical properties of the thermoplastic elastomer. Additionally, blends of PBI with aromatic polyether copolymer containing pyridine units in the main chain have also been prepared, resulting in easily doped membranes with excellent mechanical properties and superior oxidative stability (Journal of the Membrane Science 2003, 252, 115). Furthermore, scientific effort has been devoted to the development of alternative low cost polymeric systems that will combine all the desired properties for application in fuel cells operating at temperatures above 120° C.

This embodiment describes the prior art of making membrane electrode assemblies as specific to the membrane system described herein. The prior art covers issues described in literature covering the following areas: (i) direct membrane catalyzation, (ii) catalyzation of coated electrode substrates, (iii) need for effecting membrane electrode bonding for seamless proton transport (iv) effective solubility of reactant gases (in particular oxygen), (v) use of pore forming agents for effective gas transport within the electrode structure. This is with the specific objective of enhancing mass transport and the ability to operate a fuel cell on a sustained higher power density level.

In the context of these prior art as collated below it is our contention that our claims as enumerated in this application provide for a more effective control of interfacial transport of dissolved reactants, protons, and electrons while preventing and minimizing the dissolution of ionic component i.e., phosphoric acid or its improved analog under the broad classification of perfluorinated sulfonic acids (PFSA).

In the context of prior art, direct catalyzation of the membrane has been described in various patents and scientific literature primarily on aqueous based polymer electrolytes, most notably of the perfluorinated sulfonic acid type. At the current state of the technology, prior efforts together with current approaches have to be tempered with ability to translate developments in this regard to mass manufacturability keeping reproducibility (batch vs. continuous) and cost in perspective. Depending on the deposition methods used, the approach towards lowering noble metal loading can be classified into four broad categories, (i) thin film formation with carbon supported electrocatalysts, (ii) pulse electrodeposition of noble metals (Pt and Pt alloys), (iii) sputter deposition (iv) pulse laser deposition and (v) ion-beam deposition. While the principal aim in all these efforts is to improve the charge transfer efficiency at the interface, it is important to note that while some of these approaches provide for a better interfacial contact allowing for efficient movement of ions, electrons and dissolved reactants in the reaction zone, others additionally effect modification of the electrocatalyst surface (such as those rendered via sputtering, electrodeposition or other deposition methods).

In the first of the four broad categories using the 'thin film' approach in conjunction with conventional carbon supported electrocatalysts, several variations have been reported, these include (a) the so called 'decal' approach where the electrocatalyst layer is cast on a PTFE blank and then decaled on to the membrane (Wilson and Gottesfeld 1992; Chun, Kim et al. 1998). Alternatively an 'ink' comprising of Nafion® solution, water, glycerol and electrocatalyst is coated directly on to the membrane (in the Na⁺ form) (Wilson and Gottesfeld 1992). These catalyst coated membranes are subsequently dried (under vacuum, 160° C.) and ion exchanged to the H⁺ form (Wilson and Gottesfeld 1992). Modifications to this approach have been reported with variations to choice of solvents and heat treatment (Qi and Kaufman 2003; Xiong and Manthiram 2005) as well as choice of carbon supports with different microstructure (Uchida, Fukuoka et al. 1998). Other variations to the 'thin film' approach have also been reported such as those using variations in ionomer blends (Figueroa 2005), ink formulations (Yamafuku, Totsuka et al. 2004), spraying techniques (Mosdale, Wakizoe et al. 1994; Kumar and Parthasarathy 1998), pore forming agents (Shao, Yi et al. 2000), and various ion exchange processes (Tsumura, Hitomi et al. 2003). At its core this approach relies on extending the reaction zone further into the electrode structure away from the membrane, thereby providing for a more three dimensional zone for charge transfer. Most of the variations reported above thereby enable improved transport of ions, electrons and dissolved reactant and products in this 'reaction layer' motivated by need to improve electrocatalyst utilization. These attempts in conjunction with use of Pt alloy electrocatalysts have formed the bulk of the current state of the art in the PEM fuel cell technology. Among the limitations of this approach are problems with controlling the Pt particle size (with loading on carbon in excess of 40%), uniformity of deposition in large scale production and cost (due to several complex processes and/or steps involved).

An alternative method for enabling higher electrocatalyst utilization has been attempted with pulse electrodeposition. Taylor et al., (Taylor, Anderson et al. 1992) one of the first to report this approach used pulse electrodeposition with Pt salt solutions which relied on their diffusion through thin Nafion® films on carbon support enabling electrodeposition in regions of ionic and electronic contact on the electrode surface. See a recent review on this method by Taylor et al., describing various approaches to pulse electrodeposition of catalytic metals (Taylor and Inman 2000). In principal this methodology is similar to the 'thin film' approach described above, albeit with a more efficient electrocatalyst utilization, since the deposition of electrocatalysts theoretically happen at the most efficient contact zones for ionic and electronic pathways. Improvements to this approach have been reported such as by Antoine and Durand (Antoine and Durand 2001) and by Popov et al., (Popov 2004). Developments in the pulse algorithms and cell design have enabled narrow particle size range (2-4 nm) with high efficiency factors and mass activities for oxygen reduction. Though attractive, there are concerns on the scalability of this method for mass scale manufacturing.

Sputter deposition of metals on carbon gas diffusion media is another alternative approach. Here however interfacial reaction zone is more in the front surface of the electrode at the interface with the membrane. The original approach in this case was to put a layer of sputter deposit on top of a regular Pt/C containing conventional gas diffusion electrode. Such an approach (Mukerjee, Srinivasan et al. 1993) exhibited a boost in performance by moving part of the interfacial reaction zone in the immediate vicinity of the membrane. Recently, Hirano et al. (Hirano, Kim et al. 1997) reported promising results with thin layer of sputter deposited Pt on wet proofed non catalyzed gas diffusion electrode (equivalent to 0.01 $mg_{Pt}/cm^2$) with similar results as compared to a conventional Pt/C (0.4 $mg_{Pt}/cm^2$) electrode obtained commercially. Later Cha and Lee (Cha and Lee 1999), have used an approach with multiple sputtered layers (5 nm layers) of Pt interspersed with Nafion®-carbon-isopropanol ink, (total loading equivalent of 0.043 $mg_{Pt}/cm^2$) exhibiting equivalent performance to conventional commercial electrodes with 0.4 $mg_{Pt}/cm^2$. Huag et al. (Haug 2002) studied the effect of substrate on the sputtered electrodes. Further, O'Hare et al., on a study of the sputter layer thickness has reported best results with a 10 nm thick layer. Further, significant advancements have been made with sputter deposition as applied to direct methanol fuel cells (DMFC) by Witham et al. (Witham, Chun et al. 2000; Witham, Valdez et al. 2001), wherein several fold enhancements in DMFC performance was reported compared to electrodes containing unsupported PtRu catalyst. Catalyst utilization of 2300 mW/mg at a current density of 260 to 380 $mA/cm^2$ was reported (Witham, Chun et al. 2000; Witham, Valdez et al. 2001). While the sputtering technique provides for a cheap direct deposition method, the principal drawback is the durability. In most cases the deposition has relatively poor adherence to the substrate and under variable conditions of load and temperature, there is a greater probability of dissolution and sintering of the deposits.

An alternative method dealing direct deposition was recently reported using pulsed laser deposition (Cunningham, Irissou et al. 2003). Excellent performance was reported with loading of 0.017 $mg_{Pt}/cm^2$ in a PEMFC, however this was only with the anode electrodes, no cathode application has been reported to date.

However, in all these new direct deposition methodologies, mass manufacturability with adequate control on reproducibility remains questionable at best. In this regard the methodologies developed by 3 M company is noteworthy, where mass manufacture of electrodes with low noble metal 1 is reported (Debe, Pham et al. 1999; Debe, Poirier et al. 1999). Here a series of vacuum deposition steps are involved with adequate selection of solvents and carbon blacks resulting in nanostructured noble metal containing carbon fibrils which are embedded into the ionomer-membrane interface (Debe, Haugen et al. 1999; Debe, Larson et al. 1999).

An alternative is the use of ion-beam techniques, where the benefits of low energy ion bombardment concurrent to thin film vacuum deposition (electron beam) process is exploited for achieving dense, adhering and robust depositions (Hirvonen 2004). This method has been recently reviewed (Hirvonen 2004) in terms of both mechanisms of ion/solid interactions during thin film growth as well as development of various protocols for specific application areas, including tribology, anti corrosion coatings, superconducting buffer layers and coatings on temperature sensitive substrates such as polymers. Modifications of this approach to prepare 3-D structures including overhang and hollow structures have also been recently reported (Hoshino, Watanabe et al. 2003). Use of dual anode ion source for high current ion beam applications has also been reported recently (Kotov 2004), where benefits for mass production environment is discussed.

In this embodiment we describe a method for improving the catalyst utilization at the interface of a polymer electrolyte imbibed with ion conducting components (such as phosphoric, polyphosphoric and analogs of perfluorinated sulfonic acids) so as to enable higher power densities (i.e., 400 mW/cm$^2$ at 0.5 V vs. RHE, 170-180° C., H$_2$/Air). It is further stated that this improved power density is attained with lower Pt loading (0.3 to 0.4 mg/cm$^2$) as compared to the current state of the art which is in the range 0.5 to 1.0 mg/cm$^2$, thus providing for a better gravimetric energy density. A further manifestation of this embodiment is the improved ability to retain ion conducting elements (such as phosphoric, polyphosphoric and analogs of perfluorinated sulfonic acids) within the reaction layer (catalyst containing zone at the interface between the electrode and the membrane). This is particularly important from the perspective of long term sustained power density as well as better tolerance to both load and thermal cycling (especially transitions to below the condensation zone).

SUMMARY

In one aspect, the invention provides a method for the preparation of novel co-polymer electrolytes, the method comprising: (a) reacting one or more aromatic pyridine monomers, wherein the aromatic pyridine monomer comprises at least one hydroxyl group, with another monomer selected from an aromatic pyridine monomer, or an aryl monomer, wherein the aromatic pyridine monomer or aryl monomer comprises a hydroxyl group, to form an aromatic pyridine polyether; (b) reacting the aromatic pyridine polyether with one or more aromatic difluoride compounds to form a co-polymer electrolyte.

In one embodiment, the invention provides a method wherein the aromatic pyridine monomer comprises two hydroxyl groups. In a further embodiment, the aromatic pyridine monomer is a compound of formula (A):

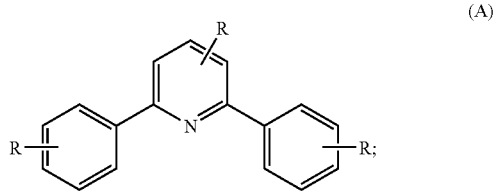

wherein each R is independently a hydroxyl group. In a certain embodiment, the aromatic pyridine monomer is 2,5-Bis(4-hydroxyphenyl)pyridine.

In another embodiment, the invention provides a method wherein the aryl monomer comprises two hydroxyl group. In a further embodiment, the aryl monomer is a compound of formula (B):

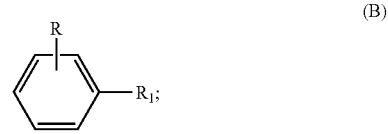

wherein R is a hydroxyl group and R$_1$ is a hydroxyl group or a hydroxyl-containing aromatic group. In certain embodiments, the aryl monomer is selected from 4,4'-biphenol or hydroquinone.

In still another embodiment, the invention provides a method wherein the aromatic difluoride compound is a compound of formula (C):

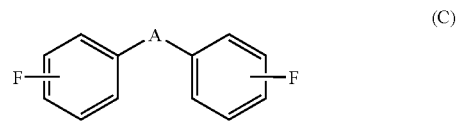

wherein A is absent or is selected from C(O), S(O)$_q$, P(O)Ph; and q is 0, 1, or 2. In certain embodiments, the aromatic difluoride compound is selected from bis-(4-fluorophenyl) sulfone, decafluorobiphenyl, 4,4'-difluorobenzophenone, or bis(4-fluorophenyl)phenylphosphine oxide.

In another embodiment, the invention provides a method wherein the co-polymer electrolyte is selected from a compound of formula I, II, or III:

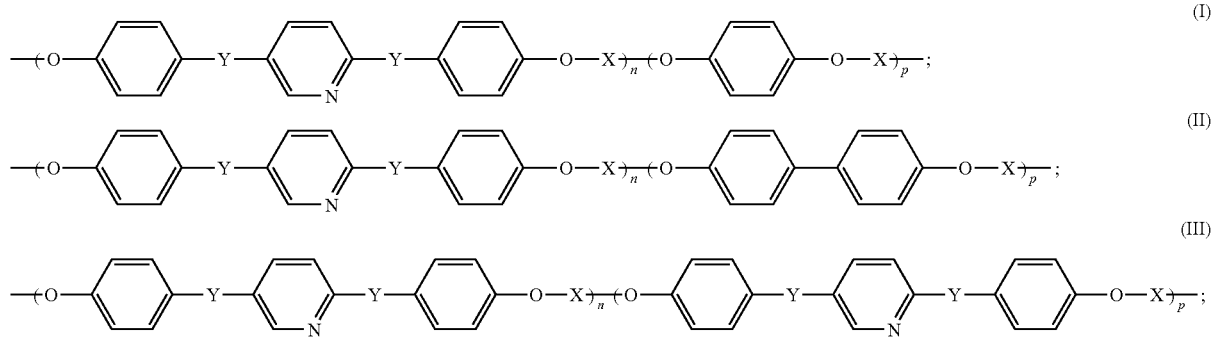

wherein each X is independently the same or different moieties and are selected from biphenylene sulfone, octafluorobiphenylene, benzophenone, or biphenylene phenylphosphine oxide; each Y is independently the same or different or absent, and is selected from substituted or unsubstituted alkylene groups, substituted or unsubstituted aromatic groups, C(O), O, or S(O)$_q$, wherein such alkylene and aromatic groups may be further substituted with C(O), O, or S(O)$_q$; q is 0, 1, or 2; and n and p are each independently about 10% to about 90%, wherein n+p=100%.

In a further embodiment, the invention provides a method wherein the co-polymer electrolyte is selected from

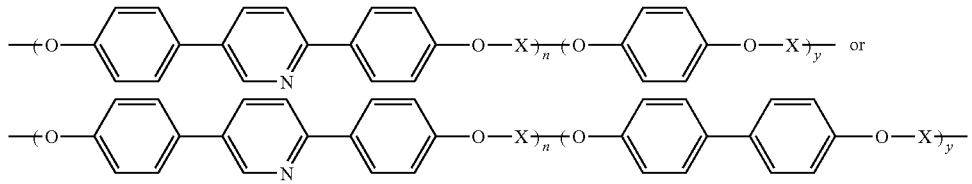

wherein X is a biphenylene sulfone moiety; and n and y are each independently about 10% to about 90%, wherein n+y=100%.

In another embodiment, the invention provides a method wherein the co-polymer electrolytes are a combination of polymers of formulae I, II, or III. In yet another embodiment, the invention provides a method wherein the co-polymer electrolytes are formed as block, random, periodic and/or alternating copolymers.

In another aspect, the invention provides a polymer composition prepared by a method comprising: (a) reacting one or more aromatic pyridine monomers, wherein the aromatic pyridine monomer comprises at least one hydroxyl group, with another monomer selected from an aromatic pyridine monomer, or an aryl monomer, wherein the aromatic pyridine monomer or aryl monomer comprises a hydroxyl group, to form an aromatic pyridine polyether; (b) reacting the aromatic pyridine polyether with one or more aromatic difluoride compounds to form a co-polymer electrolyte.

In one embodiment, the aromatic pyridine monomer comprises two hydroxyl groups. In a further embodiment, the aromatic pyridine monomer is a compound of formula (A):

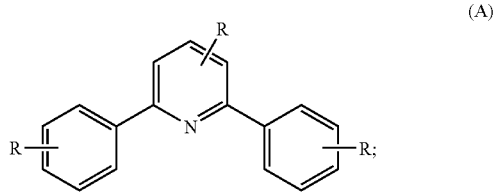

(A)

wherein each R is independently a hydroxyl group. In certain embodiment, the aromatic pyridine monomer is 2,5-Bis(4-hydroxyphenyl)pyridine.

In another embodiment, the aryl monomer comprises two hydroxyl group. In a further embodiment, the aryl monomer is a compound of formula (B):

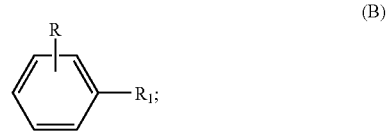

(B)

wherein R is a hydroxyl group and $R_1$ is a hydroxyl group or a hydroxyl-containing aromatic group. In certain embodiments, the aryl monomer is selected from 4,4'-biphenol or hydroquinone.

In another embodiment, the aromatic difluoride compound is a compound of formula (C):

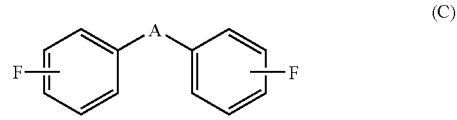

(C)

wherein A is absent or is selected from C(O), S(O)$_q$, P(O)Ph; and q is 0, 1, or 2. In certain embodiments, the aromatic difluoride compound is selected from bis-(4-fluorophenyl) sulfone, decafluorobiphenyl, 4,4'-difluorobenzophenone, or bis(4-fluorophenyl)phenylphosphine oxide.

In another embodiment, the invention provides a polymer composition, wherein the co-polymer electrolyte is selected from a compound of formula I, II, or III:

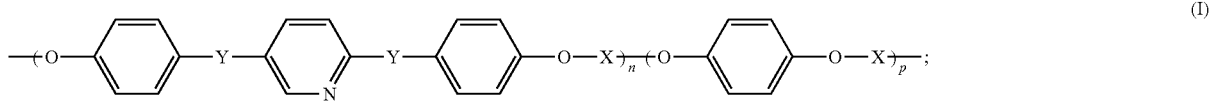

(I)

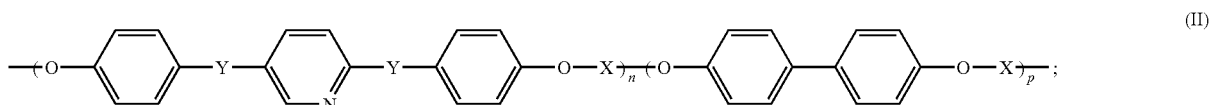

(II)

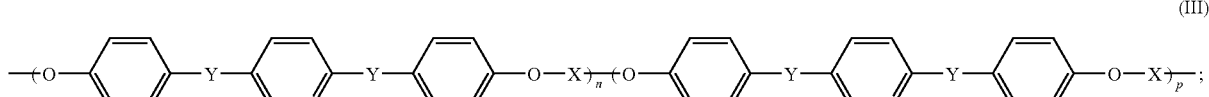

(III)

wherein each X is independently the same or different moieties and are selected from biphenylene sulfone, octafluorobiphenylene, benzophenone, or biphenylene phenylphosphine oxide; each Y is independently the same or different or absent, and is selected from substituted or unsubstituted alkylene groups, substituted or unsubstituted aromatic groups, C(O), O, or S(O)$_q$, wherein such alkylene and aromatic groups may be further substituted with C(O), O, or S(O)$_q$; q is 0, 1, or 2; and n and p are each independently about 10% to about 90%, wherein n+p=100%.

In a further embodiment, the co-polymer electrolyte is selected from

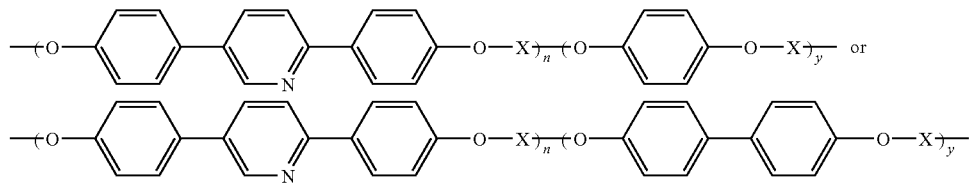

wherein X is a biphenylene sulfone moiety; and n and y are each independently about 10% to about 90%, wherein n+y=100%.

In certain embodiments, the co-polymer electrolytes are a combination of polymers of formulae I, II, or III.

In another embodiment, the co-polymer electrolytes are formed as block, random, periodic and/or alternating copolymers.

In still other embodiment, the polymer composition is prepared by a method further comprising the step of doping the polymer composition. In a further embodiment, the doping agent is selected from (a) strong acids selected from sulfuric acid, phosphoric acid, hydrochloric acid, nitric acid and combinations thereof; (b) fluorinated sulfonic acids selected from trifluoromethane sulfonic acid, tetrafluoroethane 1,2 disulfonic acid, 1,2,3,4 perfluorobutane tetrasulfonic acid, trifluoroacetic acid and combinations thereof, (c) heteropolyacids with the general formula $[PM_{12}O_{40}]^{+3}$, selected from $H_3PW_{12}O_{40} \cdot nH_2O$ (PWA), $H_3PMo_{12}O_{40} \cdot nH_2O$ (PMoA) and $H_4SiW_{12}O_{40} \cdot nH_2O$ (SiWA) and combinations thereof; or (d) antimonic and phosphatooantimonic acid and combinations thereof. In a further embodiment, the doping agent is phosphoric acid. In other embodiment, the doping agent level is 200-250 wt %.

In another aspect, the invention provides a polymer composition, comprising a co-polymer of formula I:

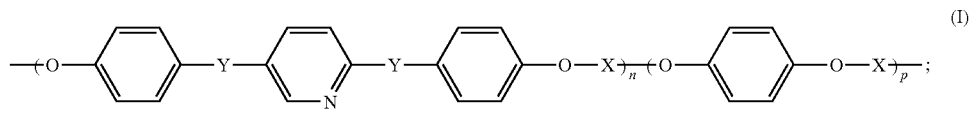

wherein each X is independently the same or different moieties and are selected from biphenylene sulfone, octafluorobiphenylene, benzophenone, or biphenylene phenylphosphine oxide; each Y is independently the same or different or absent, and is selected from substituted or unsubstituted alkylene groups, substituted or unsubstituted aromatic groups, C(O), O, or S(O)$_q$, wherein such alkylene and aromatic groups may be further substituted with C(O), O, or S(O)$_q$; q is 0, 1, or 2; and n and p are each independently about 10% to about 90%, wherein n+p=100%.

In another aspect, the invention provides a polymer composition, comprising a co-polymer of formula II:

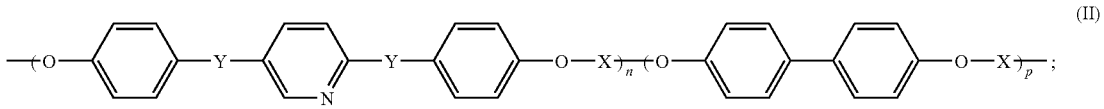

wherein each X is independently the same or different moieties and are selected from biphenylene sulfone, octafluorobiphenylene, benzophenone, or biphenylene phenylphosphine oxide; each Y is independently the same or different or absent, and is selected from substituted or unsubstituted alkylene groups, substituted or unsubstituted aromatic groups, C(O), O, or S(O)$_q$, wherein such alkylene and aromatic groups may be further substituted with C(O), O, or S(O)$_q$; q is 0, 1, or 2; and n and p are each independently about 10% to about 90%, wherein n+p=100%.

In another aspect, the invention provides a polymer composition, comprising a co-polymer of formula III:

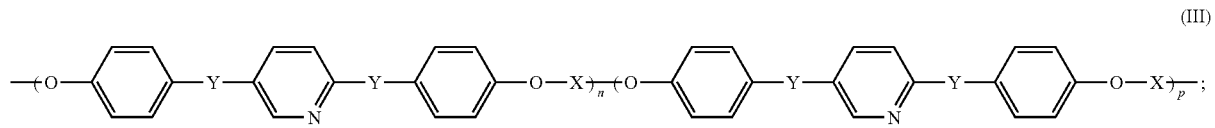

wherein each X is independently the same or different moieties and are selected from biphenylene sulfone, octafluorobiphenylene, benzophenone, or biphenylene phenylphosphine oxide; each Y is independently the same or different or absent, and is selected from substituted or unsubstituted alkylene groups, substituted or unsubstituted aromatic groups, C(O), O, or S(O)$_q$, wherein such alkylene and aromatic groups may be further substituted with C(O), O, or S(O)$_q$; q is 0, 1, or 2; and n and p are each independently about 10% to about 90%, wherein n+p=100%.

In certain embodiments, the co-polymer is selected from:

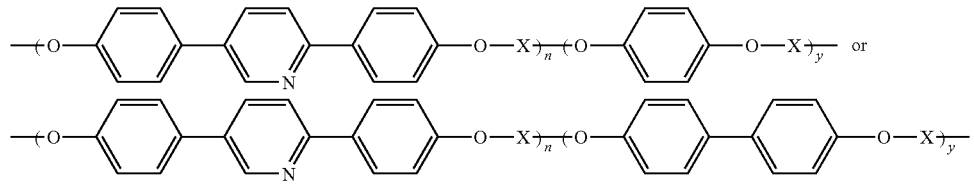

wherein X is a biphenylene sulfone moiety; and n and y are each independently about 10% to about 90%, wherein n+y=100%.

In other embodiments, the invention provides a polymer composition wherein the polymer compositions comprise a combination of polymers of formulae I, II, or III.

In another embodiment, the invention provides a polymer composition wherein the polymers are block, random, periodic and/or alternating copolymers.

In another aspect, the invention provides a method of casting co-polymers or combination of co-polymers comprising: (a) dissolving the copolymers in a solvent; (b) mixing the corresponding polymer solutions in a ratio of about 0 wt % to about 100 wt % for each co-polymer component; and (c) evaporating the solvent.

In certain embodiments, the evaporation of the solvent takes place at 80-100° C. for about 24 h. In other embodiments, the evaporation of the solvent takes place at 100-170° C. under vacuum. In other embodiments, the casting is carried out by melt extrusion for continuous membranes preparation.

In another aspect, the invention provides for a membrane electrode assembly (MEA) comprising of anode-membrane-cathode sandwich, wherein each electrode in the sandwich structure comprising (i) a substrate layer, (ii) a gas diffusion layer and (iii) a reaction layer comprising the polymer composition of the invention.

DETAILED DESCRIPTION

Polymer Membrane Electrolyte

Figure 1:
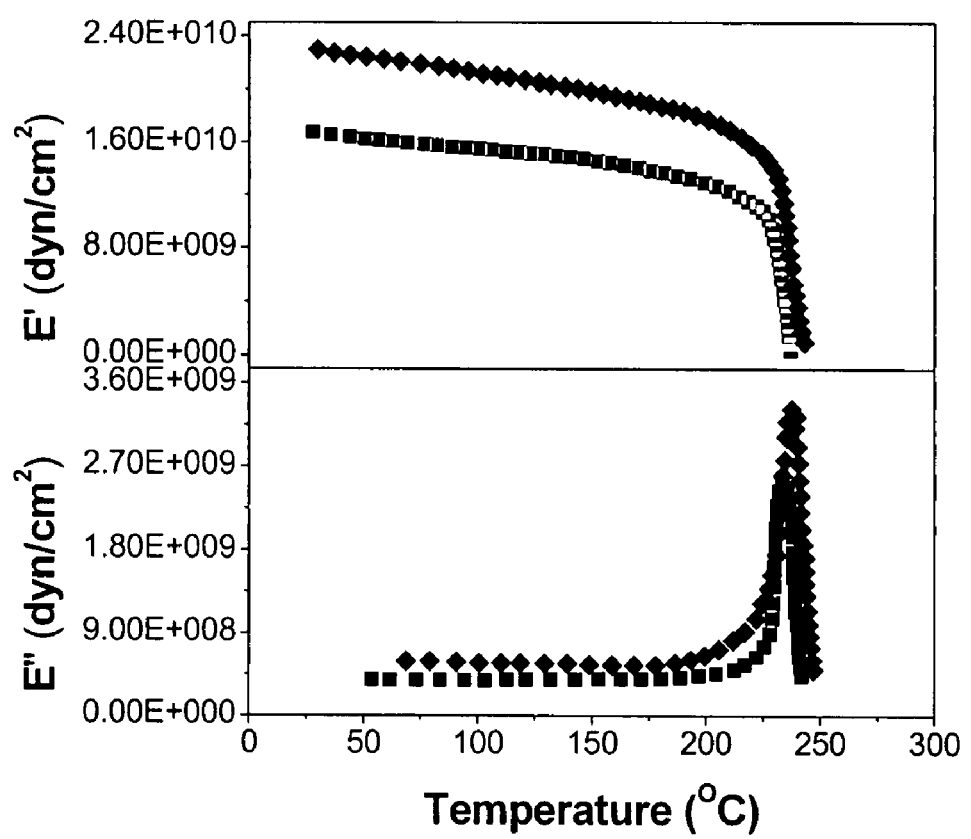
FIG. 1: Temperature dependence of the storage (E') and loss (E") modulus for copolymer Ia n=50 mol % (■) and n=60 mol % (♦).

The present invention relates to the development of copolymers containing pyridine groups, enabling thus the formation of complexes with stable acids, such as phosphoric acid. More specifically, these pyridine based copolymers are aromatic polyethers composed of 4,4'-biphenol or hydroquinone and different aromatic difluorides such as bis-(4-fluorophenyl)sulfone, decafluorobiphenyl, 4,4'-difluorobenzophenone, bis(4-fluorophenyl)phenylphosphine oxide. The resulted materials combine the good mechanical properties, with high thermal, chemical and oxidative stability, and high ionic conductivity values, thus being promising candidates for high temperature proton-exchange membranes in fuel cells.

The synthesized copolymers structures are given below, where X is either identical or different moieties such as biphenylene sulfone, octafluorobiphenylene, benzophenone, biphenylene phenylphosphine oxide and n is the pyridine diol content (varies from 10% to 90%). Y is either identical or different or in some cases absent, comprised further of alkylene chains or aromatic groups, atoms such as oxygen or sulfur, and groups containing carbonyl or sulfones. Alkylene groups are short or long chains ranging between 1 to 10 carbon atoms.

Aromatic units are five or six-membered aromatic or heteroaromatic rings. Aromatic groups may be substituted by 1 to 4 substituents. Preferred substituents may be hydrogen, halogen atoms, amino groups, hydroxyl groups, cyano groups or alkyl groups such as methyl or ethyl groups. For the purpose of the present invention, aromatic polyethers comprising recurring pyridine and biphenyl or hydroquinone moieties are represented by the following general formulae.

obtained, with number average molar mass between 60000-115000, as determined by GPC using polystyrene standards, by varying copolymerization times, ranging from 24 to 30 h, and temperatures from 150 to 180° C. The GPC results are given in Table 1. The synthesized copolymers are very soluble in common solvents such as chloroform, dimethylacetamide, dimethylformamide. All copolymers showed excellent film-forming properties regardless to their molecular weight. Copolymer IIa was synthesized via the same polycondensation reaction of 2,5-bis(4-hydroxyphenyl)pyridine, 4,4'-biphenol and bis-(4-fluorophenyl)sulfone. Depending on the polymerization conditions, copolymers with molecular weights ranging from 9000 to 38000 were obtained, as shown in Table 1. All copolymers are very soluble in common

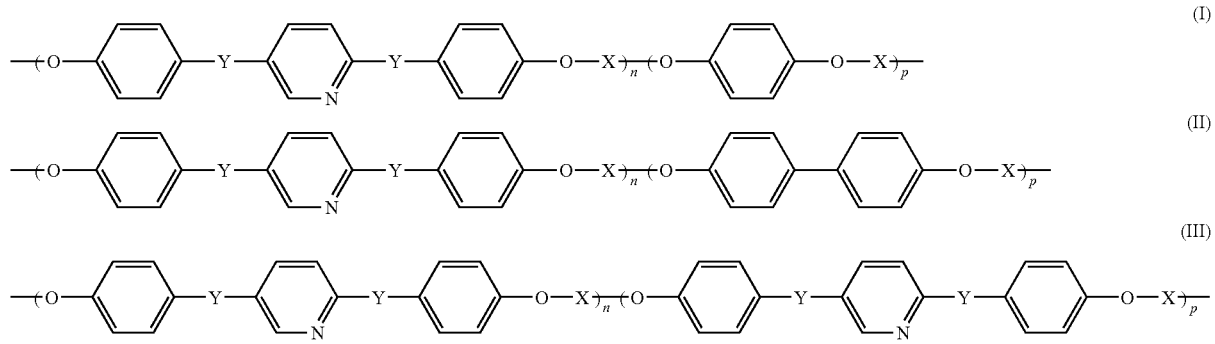

Particular preference is given to polyethers having recurring units of the formulae (I) and (II) in which X is the biphenylene sulfone moiety.

organic solvents like chloroform, dimethylacetamide, dimethylformamide. These copolymers showed good film-forming properties except copolymer Ia with Mn=9000.

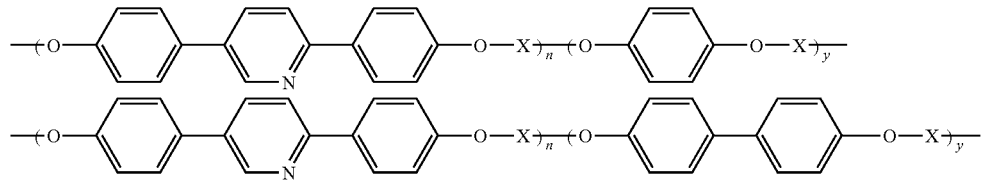

All the above mentioned copolymers have been synthesized via potassium carbonate mediated direct aromatic nucleophilic substitution polycondensation of 2,5-Bis(4-hydroxyphenyl)pyridine, 4,4'-biphenol or hydroquinone and difluorides such as bis-(4-fluorophenyl)sulfone, decafluorobiphenyl, 4,4'-difluorobenzophenone, bis(4-fluorophenyl) phenylphosphine oxide. The 2,5-Bis(4-hydroxyphenyl)pyridine monomer was synthesized according to published procedure (*Chemistry of Materials* 2003, 15(46), 5044). All the copolymers have been studied regarding their mechanical properties, their thermal and oxidative stability and their doping ability with strong acids. The most preferable structures, copolymers Ia and IIa are further discussed in more details.

Figure 2:
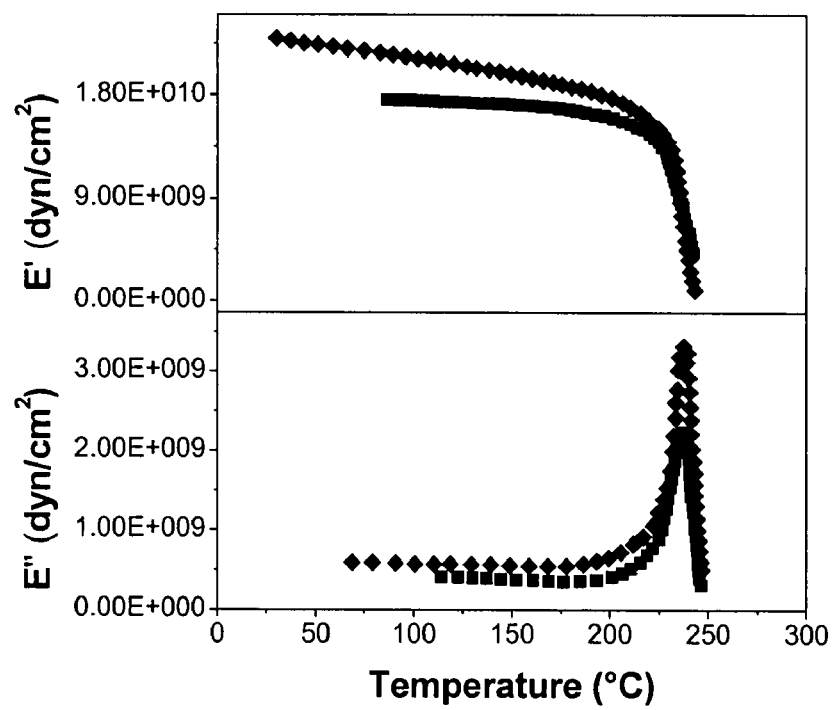
FIG. 2: Temperature dependence of the storage (E') and loss (E") modulus for copolymer Ia with n=60 mol % before (■) and after (♦) treatment with $H_2O_2$.

Copolymers Ia were prepared via potassium carbonate mediated direct aromatic nucleophilic substitution polycondensation of 2,5-bis(4-hydroxyphenyl)pyridine, hydroquinone and bis-(4-fluorophenyl)sulfone using DMF and toluene as solvents. High molecular weight copolymers were The mechanical properties of the copolymers Ia and IIa were examined with Dynamic Mechanical Analysis (DMA). Both copolymers Ia with n=60 mol % and n=50 mol % respectively, showed high glass transition temperatures over 230° C. as depicted in FIG. 1. Additionally, copolymer IIa with n=50 mol % showed higher glass transition temperature (Tg) over 245° C. All used copolymers show exceptional oxidative stability which was tested using the Fenton's test. With this test the membranes are exposed to a strongly oxidative environment. More specifically, membranes were treated with hydrogen peroxide in the presence of ferrous ions at 80° C. for 48 h. In this way hydroxyl and hydroperoxy radicals are created which can cause structural changes to polymer through their addition to the benzene rings which could lead either to chain scission or to ring opening. Such structural changes could further affect some physical properties of the materials. However copolymer Ia with n=60 mol % retained its flexibility and mechanical integrity as shown in FIG. 2, where films before and after treatment showed identical mechanical spectra. In the case of copolymer IIa with n=50 mol %, is also observed that preserved its flexibility and mechanical integrity even after treatment with hydrogen peroxide.

Figure 3:
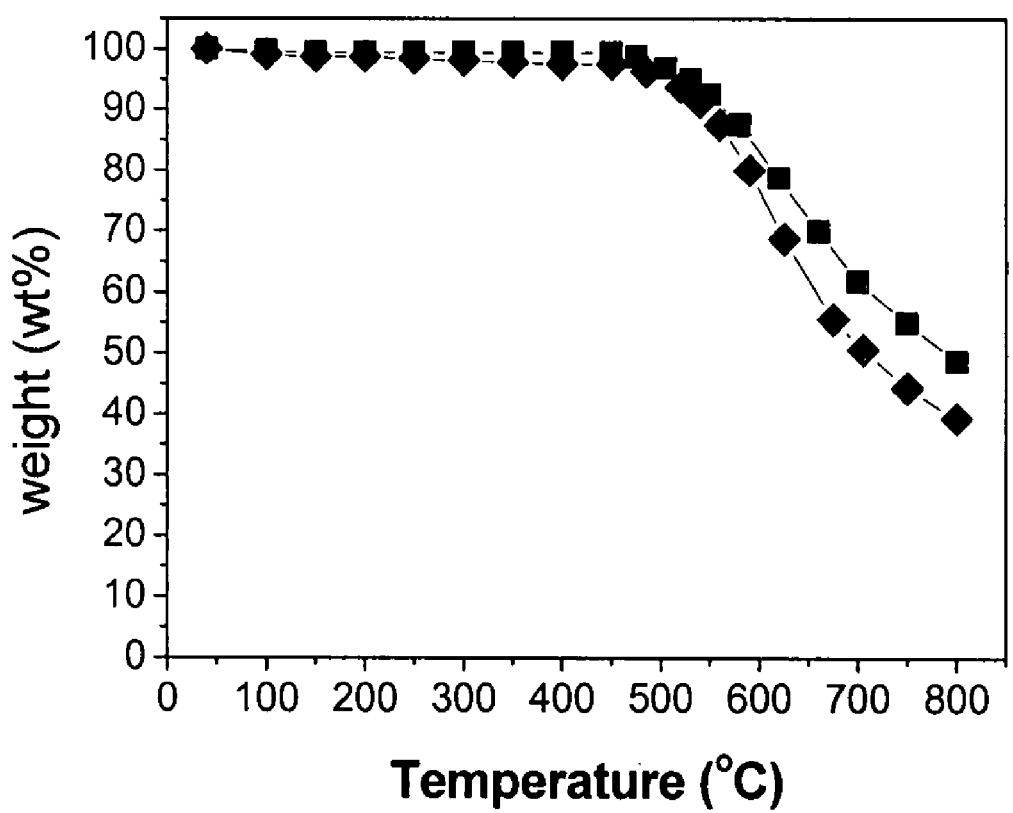
FIG. 3: TGA thermograms in argon atmosphere of the copolymer Ia With n=60 mol % before (♦) and after (■) treatment with $H_2O_2$.
Figure 4:
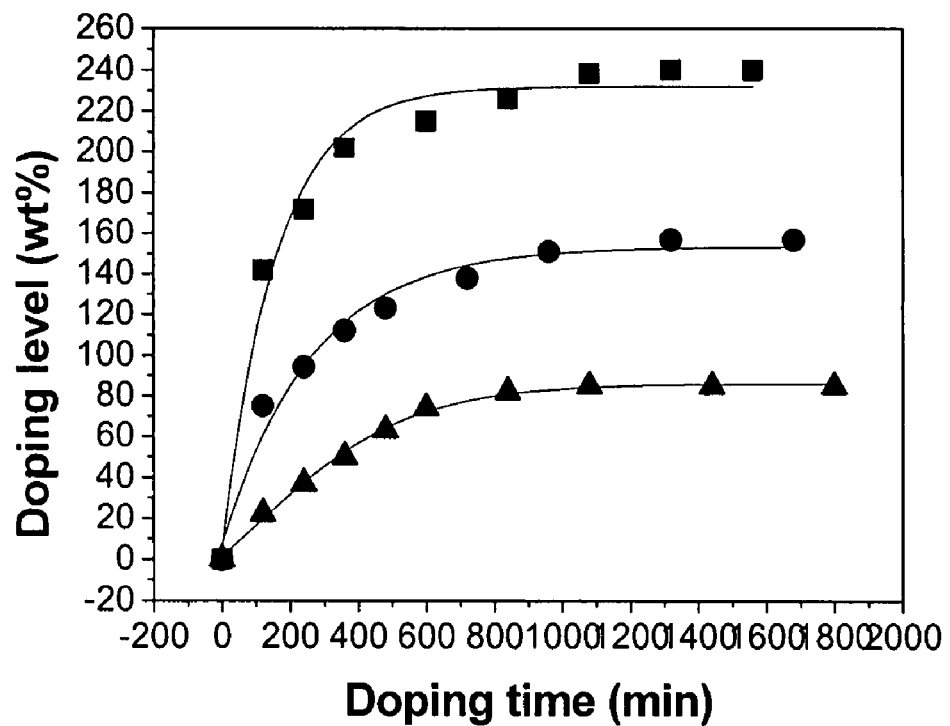
FIG. 4: Time dependence of doping ability of copolymer Ia with n=50 mol % at 50° C. (▲), 80° C. (●) and 120° C. (■).
Figure 5:
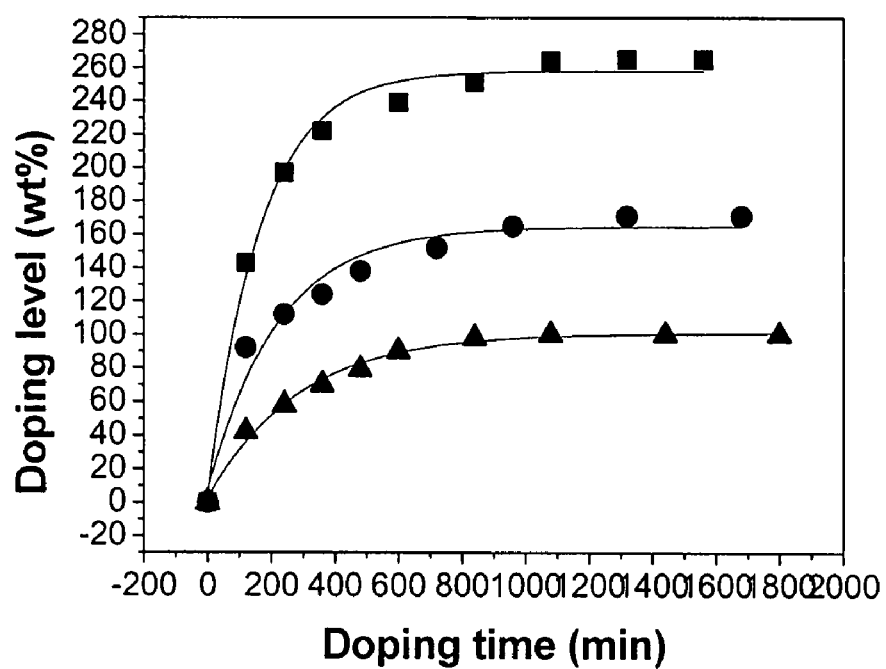
FIG. 5: Time dependence of doping ability of copolymer Ia with n=60 mol % at (▲) 50° C., (●) 80° C. and (■) 120° C.

In addition, the copolymer membrane Ia showed high thermal stability, as revealed by Thermogravimetric Analysis (TGA). More specifically, copolymer Ia with n=60 mol % was thermally stable up to 450° C. even after treatment with hydrogen peroxide, as shown in FIG. 3. In order to assure high ionic conductivity, copolymers must be able to be doped with a strong acid. Thus, the membranes were doped with phosphoric acid at different temperatures and for different doping times. Copolymer Ia with n=50 mol % at low doping temperatures (T=50° C.) absorbed acid at about 85 wt %. At higher doping temperatures, 80 and 120° C. respectively, the doping ability was improved and the maximum doping level obtained was about 157 and 240 wt %, respectively (FIG. 4). In the case of copolymer Ia with n=60 mol %, the doping level reached 265 and 171 wt % at 120 and 80° C. respectively (FIG. 5).

Copolymer IIa was doped with phosphoric acid and the doping behavior at different temperatures and for different doping times was also studied. At 80° C., the doping level for copolymer IIa with n=50 mol % reached 80 wt %, while in the case of copolymer IIa with n=60 wt % the value was around 160 wt % for the same doping time (5 hours). At higher doping temperature (T=120° C.), the doping ability of both copolymers was improved, where copolymer IIa with n=60 mol % had a doping level around 280 wt %, while copolymer IIa with n=50 mol % had 133 wt % for the same doping time (6 hours).

Figure 6:
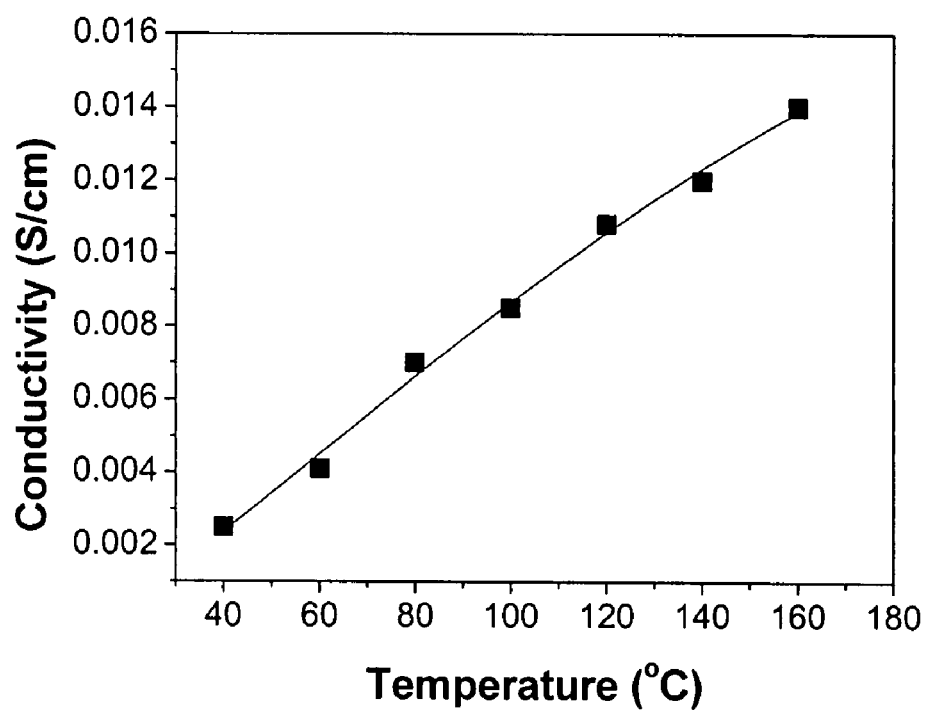
FIG. 6: Temperature dependence of conductivity of the copolymer Ia with n=50 mol % with doping level 240 wt % and relative humidity 60%.

The dependence of ionic conductivity on temperature for copolymer Ia with n=50 mol % is presented in FIG. 6. Conductivity was increased upon the increase of temperature. The conductivity reached a value of $1.4 \times 10^{-2}$ S/cm at 160° C. with doping level 240 wt % and relative humidity 60%.

It is the present invention we describe also a method for implementing membrane electrode assemblies with above mentioned improvements using the new polymer electrolytes as described in this invention. The implementation of membrane electrode assembly comprises of (a) gas diffusion and current collecting electrode component, (b) newly formulated reaction layer component comprising of the catalyst, ion conducting elements in conjunction with crosslinkers and (c) the choice of Pt alloy electrocatalysts for enhanced CO tolerance and oxygen reduction reaction activity.

The Gas Diffusion Electrode Component

The electrically conducting substrate is chosen from a combination of woven carbon cloth (such as Toray fiber T-300) or paper (such as the Toray TGP-H-120), previously wet-proofed using TFE based solutions (DuPont, USA). The typical porosity of this carbon substrate is between 75-85%. The wet proofing is achieved with a combination of dip coating for fixed duration (between 30 secs to 5 mins) followed with drying in flowing air. Such a wet proofed substrate is coated with a gas diffusion layer comprising of select carbon blacks and PTFE suspension. The choice of carbon blacks used in this layer ranged from Ketjen black to turbostratic carbons such as Vulcan XC-72 (Cabot Corp, USA) with typical surface areas in the range of 250 to 1000 m²/gm. The deposition being afforded by a coating machine such as Gravure coaters from Euclid coating systems (Bay City, Mich., USA). A Slurry comprising of a composition of carbon black and PTFE (poly tetrafluoro ethylene) aqueous suspension (such as Dupont TFE-30, Dupont USA) is applied to a set thickness over the carbon paper or cloth substrate with the aid of the coating machine. Typical thickness of 50-500 microns is used. It is also stated that pore forming agents are used to prepare this diffusion layer on the carbon conducting paper or cloth substrate. Careful control of the pore formers which consist of various combinations of carbonates and bicarbonates (such as ammonium and sodium analogs) affords control of gas access to the reaction zone. This is achieved by incorporation of these agents in the slurry mixture comprising of carbon black and PTFE suspension. Typical porosity rendered in this fashion differs from anode and cathode electrode and is in the range of 10-90%. Coated carbon substrates containing the gas diffusion layers were sintered to enable proper binding of components; this is achieved using thermal treatment to temperatures significantly above the glass transition point for PTFE, usually in the range 100 to 350° C. for 5 to 30 mins.

Formation of Reaction Layer Comprising of Electrocatalyst and Ion Conducting Components On the surface of the above mentioned gas diffusion layer an additional layer comprising of a carbon supported catalyst, ion conducting elements (such as phosphoric acid, polyphosphoric acid or perfluoro sulfonic acid analogs), pore forming agents, and binder (such as PTFE, using TFE-30 dispersion, from Dupont, USA) is added using a variety of methods comprising of spraying, calendaring and or screen printing.

Typical steps involve first appropriate choice of the electrocatalyst based on anode or cathode electrodes. For Anode Pt in conjunction of another transition metal such as Ru, Mo, Sn is used. This is motivated by the formation of oxides on these non noble transition metals at lower potentials to enable oxidation of CO or other $C_1$ moieties which are typical poisons in the output feed of fuel reformers (steam reformation of natural gas, methanol, etc.). The choice of electrocatalyst included Pt and second transition element either alloyed or in the form of mixed oxides. The choice dependant on the application based on choice of fuel feed-stock. The electrocatalysts are in the form of nanostructured metal alloys or mixed oxide dispersions on carbon blacks (turbostratic carbon support materials usually Ketjen black or similar material)

At the cathode electrocatalysts which are relatively immune from anion adsorption and oxide formation are preferred. In this case the choice of the alloying element ranges between available first row transition elements typically Ni, Co, Cr, Mn, Fe, V, Ti, etc. Prior recent studies have shown that adequate alloying of these transition elements with Pt results in deactivation of Pt for most surface processes (lowering of surface workfunction) (Mukerjee and Urian 2002; Teliska, Murthi et al. 2003; Murthi, Urian et al. 2004; Teliska, Murthi et al. 2005). This renders the surface largely bare for molecular oxygen adsorption and subsequent reduction. Lowering anion adsorption such as phosphate anion for a phosphoric acid based ion conductor is crucial for enabling enhanced oxygen reduction kinetics. In addition to choice of alloys the use of perfluorosulfonic acids either alone or as a blend with other ion conductors is used to enhance oxygen solubility. It is well known that oxygen solubility is approximately eight times higher in these fluorinated analogs as compared to phosphoric acid based components (Zhang, Ma et al. 2003). The electrocatalyst of choice is obtained from commercial vendors such as Columbian Chemicals (Marrietta, Ga., USA), Cabot Superior Micro-powders (Albuquerque, N. Mex., USA). The typical weight ratio of the catalyst on carbon support being 30-60% of metal on carbon.

Second step involves preparation of slurry using a combination of electrocatalyst in a suspension containing solubilized form of the polymer substrate (structures I and II), ion conducting element in a blend of phosphoric acid, polyphoshoric acid, and analogs of perfluorinated sulfonic acids together with PTFE (Dupont, USA) as a binder. Additionally pore forming components based on a combination of carbonates and bicarbonates are added in a ratio of 5-10% by weight. The ratio of the components has a variation of 10-30% within choice of each component enabling a total catalyst loading 0.3 to 0.4 mg of Pt or Pt alloy/$cm^2$. The application of the slurry is achieved via a combination or exclusive application of calendaring, screen printing or spraying.

Catalyst application so achieved in the form of a reaction layer is followed by a third step which comprises of sintering and drying of electrode layer. In this step the electrodes are subjected to two step process initially involving drying at 160° C. for 30 mins followed by sintering at temperatures in the range of 150-350° C. for a time period in the range of 30 mins to 5 hrs.

Formation of Membrane Electrode Assembly

Preparation of membrane electrode assembly required the use of a die where the sandwich of anode membrane and cathode electrodes is placed in an appropriate arrangement of gasket materials, typically a combination of polyimide and polytetrafluorethylene (PTFE, Dupont, USA). This is followed by hot pressing using a hydraulic press. Pressures in the range of 0.1 to 10 bars are applied with platen temperatures in the range of 150 to 250° C. for time periods typically in the range of 10 to 60 mins. The membrane electrode assemblies so prepared have thickness in the range of 75 to 250 micro meters. This provides for a final assembly of the membrane electrode assembly.

The invention also contemplates a layered sandwich structure herein referred to as membrane electrode assembly (MEA) comprising of anode-membrane-cathode sandwich. Each electrode in this sandwich structure comprises of separate layers. These layers consist of a (i) substrate layer, (ii) a gas diffusion layer and (iii) a reaction layer comprising a polymer. While the individual components such as in (i) the substrate layer or materials for gas diffusion layer and the catalysts in (iii) the reaction layer are obtained from commercial vendors, our method for rendering the MEA structure is unique and enables higher power density (300-500 mW/$cm^2$ at 1.5 bar pressure, 170-200° C. with $H_2$/Air). This high power density is attained by a unique combination of (a) pore forming agents in the gas diffusion and catalyst containing reaction layers, (b) use of fluorinated ion conducting analogs along with other non-volatile acids (such as phosphoric and polyphosphoric acid) to enhance oxygen solubility and proton conductivity in the catalyst containing layer. (c) Careful choice of hydrophobicity of the carbon paper or cloth backing layer to enable better water management especially in the cathode electrode.

Characterization Methods

NMR (Nuclear Magnetic Resonance): used in order to identify the chemical and molecular structure of the polymers and the proportion of the monomers in the copolymers.

GPC (Gel Permeation Chromatography): used in order to determine the molecular weight (Mn and Mw) and dispersity of the polymers.

DMA (Dynamic Mechanical Analysis): used in order to identify the $T_g$ of the copolymers.

TGA (Thermogravimetric Analysis): used in order to study the thermal, and oxidative stability before and after Fenton's test as well as before and after doping with acids.

FENTON'S TEST: used in order to study and determine the oxidative stability of the copolymers.

FOUR-PROBE CURRENT INTERRUPTION METHOD: used in order to obtain data of the proton conductivity of the polymer electrolyte membranes.

The following non-limiting examples are illustrative of the invention. All documents mentioned herein are incorporated herein by reference.

EXAMPLES

Example 1

0.7758 g 2,5-Bis(4-hydroxyphenyl)pyridine, 1.5 g Bis(4-fluorophenyl)-sulfone, 0.3248 g Hydroquinone, 0.9444 g $K_2CO_3$, and 16.9 ml DMF and 10.8 ml Toluene were introduced into a degassed round bottom flask equipped with a magnetic stirrer, a Dean Stark trap and an argon inlet. The reaction mixture stirred at 150° C. for 24 h, and then stirred at 180° C. for 6 h under argon atmosphere. The viscous product was diluted in DMF and precipitated in a 10-fold excess mixture of 2/1 MeOH/$H_2O$, washed with $H_2O$ and Hexane, and dried at 80° C. under vacuum for 1 day. The same procedure was followed to produce copolymers Ia with different copolymer composition and pyridine monomer content.

Example 2

0.5 g 2,5-Bis(4-hydroxyphenyl)pyridine, 0.8047 g Bis(4-fluorophenyl)-sulfone, 0.2357 g 4,4'-biphenol, 0.5072 g $K_2CO_3$, and 7.5 ml DMF and 4.1 ml Toluene were introduced into a degassed round bottom flask equipped with a magnetic stirrer, a Dean Stark trap and an argon inlet. The reaction mixture stirred at 120° C. for 19 h, and then stirred at 170° C. for 5 h under argon atmosphere. The viscous product was diluted in DMA and precipitated in a 10-fold excess mixture of 2/1 MeOH/$H_2O$, washed with $H_2O$ and Hexane, and dried at 80° C. under vacuum for 1 day. The same procedure was followed to produce copolymers IIa with different copolymer composition and pyridine monomer content.

Example 3

0.5 g of copolymer Ia was dissolved in 10 ml dimethylacetamide at room temperature. The solution was filtered and poured onto a glass plate of 100 mm diameter. The solvent was slowly evaporated at 80° C. in an oven for 24 h. The resulting membranes were dried under vacuum at 160° C. for 3 days in order to remove any excess of the solvent.

Example 4

0.5 g of copolymer IIa was dissolved in 10 ml dimethylacetamide at room temperature. The solution was filtered and poured onto a glass plate of 100 mm diameter. The solvent was slowly evaporated at 80° C. in an oven for 24 h. The resulting membranes were dried under vacuum at 160° C. for 3 days in order to remove any excess of the solvent.

Example 5

Carbon paper (Toray TGP H-120) is initially wet proofed by dipping in a TFE-30 dispersion (Dupont, USA). For this a typical loading of 0.6-1.5 mg/$cm^2$ was used. The gas diffusion layer was applied using a slurry comprising of Ketjen black (Engelhard, USA) with a surface area of 250 $m^2$/gm, TFE –30 dispersion (Dupont, USA), ammonium carbonate in a ratio of 60:30:10% respectively. This slurry after adequate stirring was calendared (Gravure coaters from Euclid coating systems (Bay City, Mich., USA) on to the wet proofed carbon paper using a calendaring machine providing for a thickness of 50-100 micro meters. The gas diffusion layer so obtained was next sintered in air using a muffle furnace with adequate venting at a temperature in the range of 100-200° C. for 10 to 15 hrs.

Reaction layer was next deposited using the choice of individual anode and cathode electrocatalysts. For this a separate slurry was prepared containing the electrocatalyst, binder (TFE-30, dispersion from Dupont, USA), ammonium bicarbonate, and a blend of solubilized form of the polymer electrolytes (structures I, II and III, either alone or in a combined form) and both volatile and non volatile acid (i.e., poly fluorinated sulfonic acid, PFSA in a combination with phosphoric acid) in a ratio ranging between 1:1 to 1:5. This slurry was calendared onto the gas diffusion side of the electrode to make the individual anode and cathode electrodes using the same procedure described above with the aid of the coating machine (Gravure coaters from Euclid coating systems (Bay City, Mich., USA). Further the reaction layer used in the cathode electrode also contained 5% by weight ammonium carbonate to afford pore formation.

Acid doped blended polymer membranes with a combination of structures I, II and III as described in earlier examples was next used to prepare the membrane electrode assembly. For this a die set up was used with Teflon (Dupont, USA) and polyimide gaskets were used for the appropriate compression and sealing in the single cell. Hot pressing conditions used were 150-250° C. and 10 bar for 25 mins.

The membrane electrode assembly so prepared was tested in a 5 cm$^2$ single cell (Fuel Cell technologies, Albuquerque, N. Mex., USA) with the aid of a potentiostat (Autolab PGSTAT-30) in conjunction with a current booster (10 A). Polarization measurements were conducted at 170-200° C., 1.5 bars, $H_2$/Air (2:2 stoichiometric flow). Steady state current was also monitored for stability studies up to 400 hrs at a constant potential of 0.5 V vs. RHE.

TABLE 1

| Copolymer | n | $M_n$ | $M_w$ | PDI |
| --- | --- | --- | --- | --- |
| Ia | 50 | 115000 | 172000 | 1.5 |
| Ia | 50 | 94000 | 143000 | 1.5 |
| Ia | 50 | 89000 | 136000 | 1.5 |
| Ia | 50 | 67000 | 113000 | 1.7 |
| Ia | 60 | 112000 | 179000 | 1.6 |
| Ia | 60 | 93000 | 154000 | 1.7 |
| Ia | 70 | 86000 | 150000 | 1.8 |
| Ia | 70 | 61000 | 96000 | 1.6 |
| Ia | 75 | 72000 | 120000 | 1.7 |
| Ia | 75 | 63000 | 132000 | 2.1 |
| IIa | 60 | 37000 | 64000 | 1.7 |
| IIa | 60 | 29800 | 48000 | 1.6 |
| IIa | 60 | 9000 | 15500 | 1.7 |
| IIa | 60 | 38000 | 64000 | 1.7 |
| IIa | 50 | 44000 | 70000 | 1.7 |
| IIa | 50 | 27000 | 53000 | 2.0 |

Citations: Documents listed below have been referred to above.

REFERENCES CITED

Antoine, O. and R. Durand (2001). "In situ Electrochemical Deposition of Pt Nanoparticles on Carbon and Inside Nafion." *Electrochem. and Solid-State Lett.* 4(5): A55.

Cha, S. Y. and W. M. Lee (1999). *J. Electrochem. Soc.* 146: 4055.

Chun, Y. G., C. S. Kim, et al. (1998). *J. Power Sources* 71: 174.

Cunningham, N., E. Irissou, et al. (2003). "PEMFC Anode with Very Low Pt Loadings Using Pulsed Laser Deposition." *Electrochem. and Solid-State Lett.* 6(7): A125-A128.

Debe, M. K., G. M. Haugen, et al. (1999). Catalyst for membrane electrode assembly and method of making. US Pat.: 20.

Debe, M. K., J. M. Larson, et al. (1999). Membrane electrode assemblies. US Pat.: 86.

Debe, M. K., T. N. Pham, et al. (1999). Process of forming a membrane electrode. US Pat.: 54.

Debe, M. K., R. J. Poirier, et al. (1999). Membrane electrode assembly. US Pat.: 42.

Figueroa, J. C. (2005). Fabrication and use of electrodes and other fuel cell components having ultra low catalyst loadings coated thereon. WO Pat., (E.I. Dupont de Nemours and Company, USA). 24 pp.

Haug, A. T. (2002). Development of low-loading, carbon monoxide tolerant PEM fuel cell electrodes: 185.

Hirano, S., J. Kim, et al. (1997). "High performance proton exchange membrane fuel cells with sputter-deposited Pt layer electrodes." *Electrochim. Acta* 42(10): 1587-1593.

Hirvonen, J. K. (2004). "Ion beam assisted deposition." *Mat Res. Soc. Symposium Proceedings* 792 (Radiation Effects and Ion-Beam Processing of Materials): 647-657.

Hoshino, T., K. Watanabe, et al. (2003). "Development of three-dimensional pattern-generating system for focused-ion-beam chemical-vapor deposition." *J. Vac. Sci. Tech., B: Microelectronics and Nanometer Structures-Processing, Measurement, and Phenomena* 21(6): 2732-2736.

Kotov, D. A. (2004). "Broad beam low-energy ion source for ion-beam assisted deposition and material processing." *Rev. Sci. Inst.* 75(5, Pt. 2): 1934-1936.

Kumar, G. S. and S. Parthasarathy (1998). A method of manufacture of high performance fuel cell electrodes with very low platinum loading. IN Pat., (India). 13 pp.

Mosdale, R., M. Wakizoe, et al. (1994). "Fabrication of electrodes for proton exchange-membrane fuel cells (PEMFCs) by spraying method and their performance evaluation." *Proc.-Electrochem. Soc.* 94-23 (Electrode Materials and Processes for Energy Conversion and Storage): 179-89.

Mukerjee, S., S. Srinivasan, et al. (1993). "Effect of sputtered film of platinum on low platinum loading electrodes on electrode. Kinetics of oxygen reduction in proton exchange membrane fuel cells." *Electrochimica. Acta* 38(12): 1661-9.

Mukerjee, S. and R. C. Urian (2002). "Bifunctionality in Pt alloy nanocluster electrocatalysts for enhanced methanol oxidation and CO tolerance in PEM fuel Cells: electrochemical and in situ synchrotron spectroscopy." *Electrochim. Acta* 47: 3219-3231.

Murthi, V. S., R. C. Urian, et al. (2004). "Oxygen Reduction Kinetics in Low and Medium Temperature Acid Environment: Correlation of Water Activation and Surface Properties in Supported Pt and Pt Alloy Electrocatalysts." *J. Phys. Chem. B* 108(30): 11011-11023.

Popov, B. N. (2004). "Electrodeposition of alloys and composites with superior corrosion and electrocatalytic properties." *Plating and Surface Finishing* 91(10): 40-49.

Qi, Z. and A. Kaufman (2003). "Low Pt loading high performance cathodes for PEM fuel cells." *J. Power Sources* 113(1): 37-43.

A simple direct mixing of carbon-supported catalysts with Nafion without adding any addnl. org. solvents was used to make electrodes for oxygen redn. in PEM fuel cells. For E-TEK 20% Pt/C, a Nafion content of 30% in the catalyst layer exhibited the best performance. Electrode dried from 90 to 150 DegC showed little difference in performance. Highest power densities increased almost linearly with cell temp., and values of 0.52, 0.60, 0.63, and 0.72 W/cm2 were achieved at 35, 50, 60, and 75 DegC, resp., for a cathode with a Pt loading of 0.12 mg/cm2 and operated using air at ambient pressure. A max. performance was achieved with Pt loadings of 0.20+−0.05 and 0.35+−0.05 mg/cm2 for 20 and 40% Pt/C, resp., while the max. performance using 40% Pt/C was only slightly better than that using 20% Pt/C. A Nafion/carbon sublayer with up to 30% Nafion content added between ELAT and the catalyst layer did not show any effect on performance. [on SciFinder (R)]

Shao, Z.-G., B.-L. Yi, et al. (2000). "New method for the preparation of the electrodes with very low platinum loading used in proton exchange membrane fuel cell." *Dianhuaxue* 6(3): 317-323.

Taylor, E. J., E. B. Anderson, et al. (1992). "Preparation of high-platinum-utilization gas diffusion electrodes for proton-exchange-membrane fuel cells." *J. Electrochem. Soc.* 139(5): L45-L46.

Taylor, E. J. and M. E. Inman (2000). Electrodeposition of catalytic metals using pulsed electric fields. WO Pat., (Faraday Technology, Inc., USA). 41 pp.

Teliska, M., V. S. Murthi, et al. (2003). *In-Situ Determination of O(H) Adsorption on Pt and Pt based Alloy Electrodes using X-ray Absorption Spectroscopy*. Fundamental Understanding of Electrode Processes, Proc.-Electrochem. Soc, Pennington, N.J.

Teliska, M., V. S. Murthi, et al. (2005). "Correlation of Water Activation, Surface Properties, and Oxygen Reduction Reactivity of Supported Pt-M/C Bimatallic Electrocatalysts using XAS." *J. Electrochem. Soc.* 152: A2159.

Tsumura, N., S. Hitomi, et al. (2003). "Development of Ultra-Low Pt—Ru Binary Alloy Catalyst Loading Gas Diffusion Electrode for PEFC." *GS News Technical Report* 62(1): 21-25.

Uchida, M., Y. Fukuoka, et al. (1998). "Improved preparation process of very-low-platinum-loading electrodes for polymer electrolyte fuel cells." *J. Electrochem. Soc.* 145(11): 3708-3713.

Wilson, M. S. and S. Gottesfeld (1992). *J. App. Electrochem.* 22: 1.

Wilson, M. S. and S. Gottesfeld (1992). "High performance catalyzed membranes of ultra-low platinum loadings for polymer electrolyte fuel cells." *J. Electrochem Soc.* 139(2): L28-L30.

Witham, C. K., W. Chun, et al. (2000). "Performance of direct methanol fuel cells with sputter-deposited anode catalyst layers." *Electrochem. and Solid-State Lett.* 3(11): 497-500.

Witham, C. K., T. I. Valdez, et al. (2001). "Methanol oxidation activity of co-sputter deposited Pt—Ru catalysts." *Proc.-Electrochem. Soc.* 2001-4 (Direct Methanol Fuel Cells): 114-122.

Xiong, L. and A. Manthiram (2005). "High performance membrane-electrode assemblies with ultra-low Pt loading for proton exchange membrane fuel cells." *Electrochimica Acta* 50(16-17): 3200-3204.

Yamafuku, T., K. Totsuka, et al. (2004). "Optimization of polymer electrolyte distribution of ultra-low platinum loading electrode for PEFC." *GS News Technical Report* 63(1): 23-27.

Zhang, L., C. Ma, et al. (2003). "Oxygen permeation studies on alternative proton exchange membranes designed for elevated temperature operation." *Electrochim. Acta* 48: 1845-1859.

What is claimed is:

1. A method for the preparation of co-polymer electrolytes, the method comprising:
    (a) reacting one or more aromatic pyridine monomers, wherein the aromatic pyridine monomer comprises at least one hydroxyl group, with another monomer selected from an aromatic pyridine monomer, or an aryl monomer, wherein the aromatic pyridine monomer or aryl monomer comprises a hydroxyl group, to form an aromatic pyridine polyether;
    (b) reacting the aromatic pyridine polyether with one or more aromatic difluoride compounds to form a co-polymer electrolyte, wherein the co-polymer contains biphenol and/or hydroquinone moieties.

2. The method of claim 1, wherein the aromatic pyridine monomer comprises two hydroxyl groups.

3. The method of claim 1, wherein the aromatic pyridine monomer is a compound of formula (A):

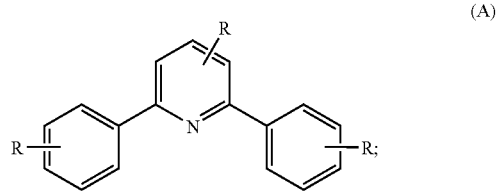

wherein each R is independently a hydroxyl group.

4. The method of claim 2, wherein the aromatic pyridine monomer is 2,5-Bis(4-hydroxyphenyl)pyridine.

5. The method of claim 1, wherein the aryl monomer comprises two hydroxyl group.

6. The method of claim 5, wherein the aryl monomer is a compound of formula (B):

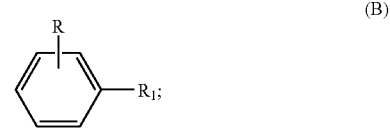

wherein R is a hydroxyl group; and
    $R_1$ is a hydroxyl group or a hydroxyl-containing aromatic group.

7. The method of claim 5, wherein the aryl monomer is selected from 4,4'-biphenol or hydroquinone.

8. The method of claim 1, wherein the aromatic difluoride compound is a compound of formula (C):

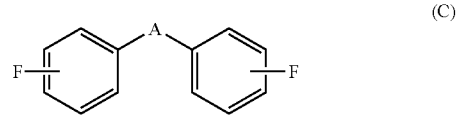

wherein A is absent or is selected from C(O), S(O)$_q$, P(O)Ph; and
    q is 0, 1, or 2.

9. The method of claim 8, wherein the aromatic difluoride compound selected from bis-(4-fluorophenyl)sulfone, decafluorobiphenyl, 4,4'-difluorobenzophenone, or bis(4-fluorophenyl)phenylphosphine oxide.

10. The method of claim 1, wherein the co-polymer electrolyte is selected from a compound of formula I, II, or III:

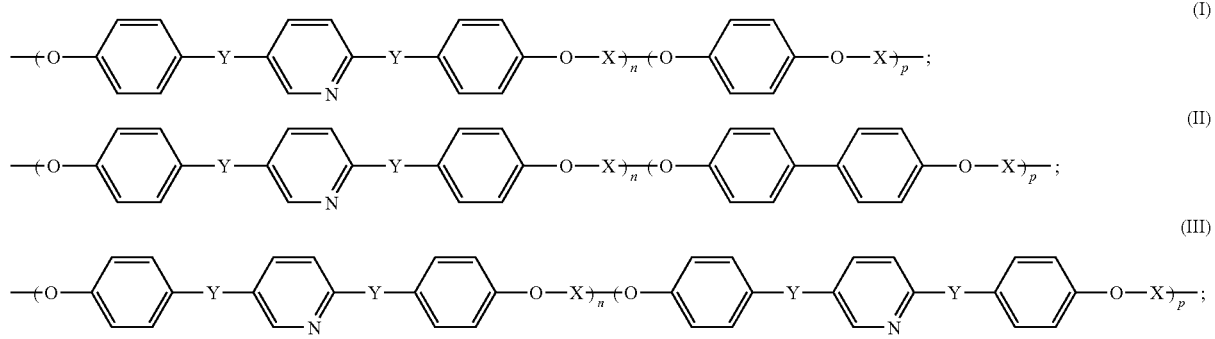

wherein each X is independently the same or different moieties and are selected from biphenylene sulfone, octafluorobiphenylene, benzophenone, or biphenylene phenylphosphine oxide;

each Y is independently the same or different or absent, and is selected from substituted or unsubstituted alkylene groups, substituted or unsubstituted aromatic groups, C(O), O, or S(O)$_q$, wherein such alkylene and aromatic groups may be further substituted with C(O), O, or S(O)$_q$;

q is 0, 1, or 2; and n and p are each independently about 10% to about 90%, wherein n+p=100%.

11. The method of claim 10, wherein the co-polymer electrolyte is selected from

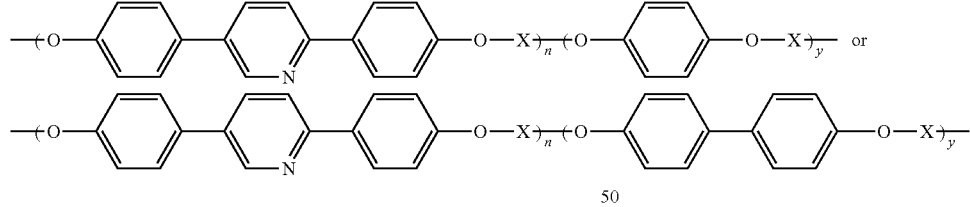

wherein X is a biphenylene sulfone moiety; and n and y are each independently about 10% to about 90%, wherein n+y=100%.

12. The method of claim 10, wherein the co-polymer electrolytes are a combination of polymers of formulae I, II, or III.

13. The method of claim 10, wherein the co-polymer electrolytes are formed as block, random, periodic and/or alternating copolymers.

14. A polymer composition obtained by a method comprising:

(a) reacting one or more aromatic pyridine monomers, wherein the aromatic pyridine monomer comprises at least one hydroxyl group, with another monomer selected from an aromatic pyridine monomer, or an aryl monomer, wherein the aromatic pyridine monomer or aryl monomer comprises a hydroxyl group, to form an aromatic pyridine polyether;

(b) reacting the aromatic pyridine polyether with one or more aromatic difluoride compounds to form a co-polymer electrolyte, wherein the co-polymer contains biphenol and/or hydroquinone moieties.

15. The polymer composition of claim 14, wherein the aromatic pyridine monomer comprises two hydroxyl groups.

16. The polymer composition of claim 15, wherein the aromatic pyridine monomer is a compound of formula (A):

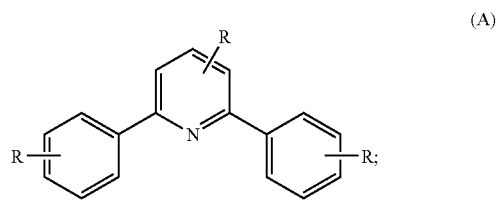

wherein each R is independently a hydroxyl group.

17. The polymer composition of claim 15, wherein the aromatic pyridine monomer is 2,5-Bis(4-hydroxyphenyl)pyridine.

18. The polymer composition of claim 14, wherein the aryl monomer comprises two hydroxyl group.

19. The polymer composition of claim 18, wherein the aryl monomer is a compound of formula (B):

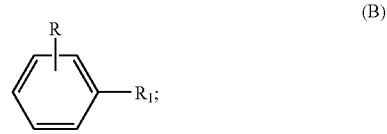

wherein R is a hydroxyl group and

R$_1$ is a hydroxyl group or a hydroxyl-containing aromatic group.

20. The polymer composition of claim 18, wherein the aryl monomer is selected from 4,4'-biphenol or hydroquinone.

21. The polymer composition of claim 14, wherein the aromatic difluoride compound is a compound of formula (C):

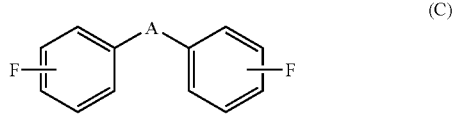

(C)

wherein A is absent or is selected from C(O), S(O)$_q$, P(O)Ph; and q is 0, 1, or 2.

22. The polymer composition of claim 14, wherein the aromatic difluoride compound is selected from bis-(4-fluorophenyl)sulfone, decafluorobiphenyl, 4,4'-difluorobenzophenone, or bis(4-fluorophenyl)phenylphosphine oxide.

23. The polymer composition of claim 14, wherein the co-polymer electrolyte is selected from a compound of formula I, II, or III:

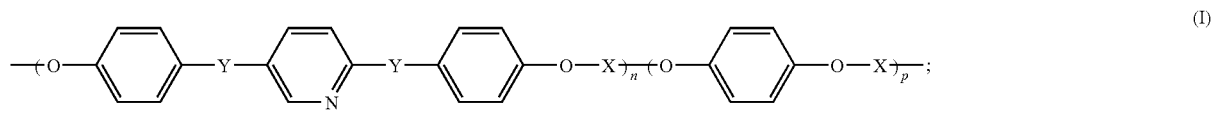

(I)

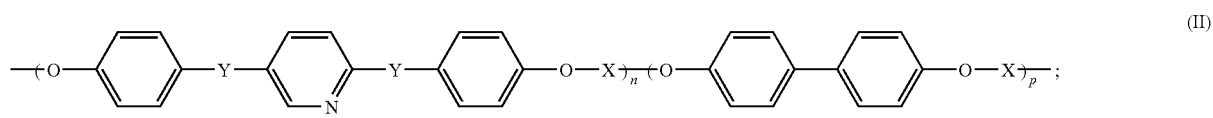

(II)

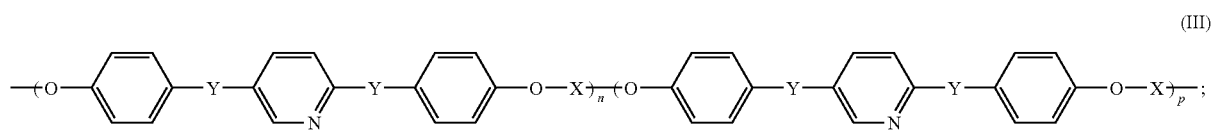

(III)

wherein each X is independently the same or different moieties and are selected from biphenylene sulfone, octafluorobiphenylene, benzophenone, or biphenylene phenylphosphine oxide;

each Y is independently the same or different or absent, and is selected from substituted or unsubstituted alkylene groups, substituted or unsubstituted aromatic groups, C(O), O, or S(O)$_q$, wherein such alkylene and aromatic groups may be further substituted with C(O), O, or S(O)$_q$;

q is 0, 1, or 2; and n and p are each independently about 10% to about 90%, wherein n+p=100%.

24. The polymer composition of claim 23, wherein the co-polymer electrolyte is selected from

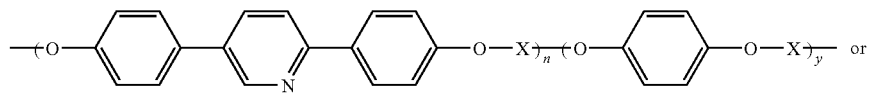 or

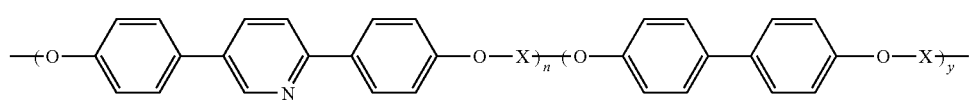

wherein X is a biphenylene sulfone moiety; and n and y are each independently about 10% to about 90%, wherein n+y=100%.

25. The polymer composition of claim 23, wherein the co-polymer electrolytes are a combination of polymers of formulae I, II, or III.

26. The polymer composition of claim 23, wherein the co-polymer electrolytes are formed as block, random, periodic and/or alternating copolymers.

27. The polymer composition of claim 23, prepared by a method further comprising the step of doping the polymer composition.

28. The polymer composition of claim 27, wherein the doping agent is selected from (a) strong acids selected from sulfuric acid, phosphoric acid, hydrochloric acid, nitric acid and combinations thereof; (b) fluorinated sulfonic acids selected from trifluoromethane sulfonic acid, tetrafluoroethane 1,2 disulfonic acid, 1,2,3,4 perfluorobutane tetrasulfonic acid, trifluoroacetic acid and combinations thereof, (c) heteropolyacids with the general formula $[PM_{12}O_{40}]^{+3}$, selected from $H_3PW_{12}O_{40} \cdot nH_2O$ (PWA), $H_3PMo_{12}O_{40} \cdot nH_2O$ (PMoA) and $H_4SiW_{12}O_{40} \cdot nH_2O$ (SiWA) and combinations thereof; or (d) antimonic and phosphatooantimonic acid and combinations thereof.

29. The polymer composition of claim 28, wherein the doping agent is phosphoric acid.

30. The polymer composition of claim 29, wherein the doping agent level is 200-250 wt %.

31. A polymer composition, comprising a co-polymer of formula I:

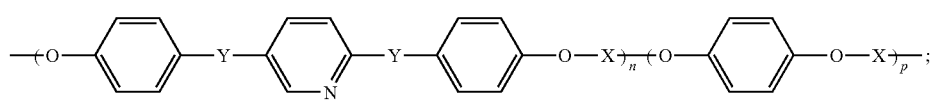

(I)

wherein the co-polymer contains biphenol and/or hydroquinone moieties and each X is independently the same or different moieties and are selected from biphenylene sulfone, octafluorobiphenylene, benzophenone, or biphenylene phenylphosphine oxide;

each Y is independently the same or different or absent, and is selected from substituted or unsubstituted alkylene groups, substituted or unsubstituted aromatic groups, C(O), O, or $S(O)_q$, wherein such alkylene and aromatic groups may be further substituted with C(O), O, or $S(O)_q$;

q is 0, 1, or 2; and n and p are each independently about 10% to about 90%, wherein n+p=100%.

32. A polymer composition, comprising a co-polymer of formula II:

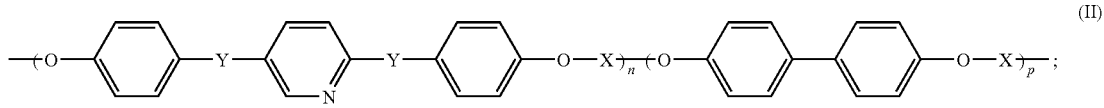

(II)

wherein the co-polymer contains biphenol and/or hydroquinone moieties and each X is independently the same or different moieties and are selected from biphenylene sulfone, octafluorobiphenylene, benzophenone, or biphenylene phenylphosphine oxide;

each Y is independently the same or different or absent, and is selected from substituted or unsubstituted alkylene groups, substituted or unsubstituted aromatic groups, C(O), O, or $S(O)_q$, wherein such alkylene and aromatic groups may be further substituted with C(O), O, or $S(O)_q$;

q is 0, 1, or 2; and n and p are each independently about 10% to about 90%, wherein n+p=100%.

33. A polymer composition, comprising a co-polymer of formula III:

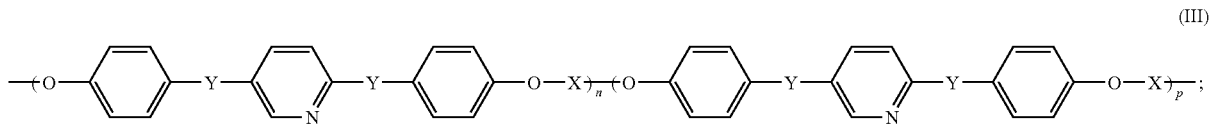

(III)

wherein the co-polymer contains biphenol and/or hydroquinone moieties and each X is independently the same or different moieties and are selected from biphenylene sulfone, octafluorobiphenylene, benzophenone, or biphenylene phenylphosphine oxide;

each Y is independently the same or different or absent, and is selected from substituted or unsubstituted alkylene groups, substituted or unsubstituted aromatic groups, C(O), O, or S(O)$_q$;

wherein such alkylene and aromatic groups may be further substituted with C(O), O, or S(O)$_q$;

q is 0, 1, or 2; and n and p are each independently about 10% to about 90%, wherein n+p=100%.

34. The polymer composition of any one of claims 31-33, wherein the co-polymer is selected from:

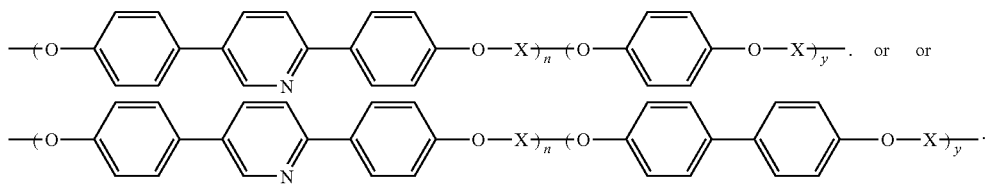

wherein X is a biphenylene sulfone moiety; and n and y are each independently about 10% to about 90%, wherein n+y=100%.

35. A polymer composition of any one of claims 31-33, wherein the polymer compositions comprise a combination of polymers of formulae I, II, or III.

36. The polymer composition of any one of claims 31-33, wherein the polymers are block, random, periodic and/or alternating copolymers.

37. A method of casting co-polymers or combination of co-polymers of claim 14 comprising:
 (a) dissolving the copolymers in a solvent;
 (b) mixing the corresponding polymer solutions in a ratio of about 0 wt % to about 100 wt % for each co-polymer component; and
 (c) evaporating the solvent.

38. The method of claim 37, wherein evaporation of the solvent takes place at 80-100° C. for about 24 h.

39. The method of claim 37, wherein evaporation of the solvent takes place at 100-170° C. under vacuum.

40. The method of claim 37, wherein the casting is carried out by melt extrusion for continuous membranes preparation.

41. A membrane electrode assembly (MEA) comprising of anode-membrane-cathode sandwich, wherein each electrode in the sandwich structure comprising (i) a substrate layer, (ii) a gas diffusion layer and (iii) a reaction layer comprising the polymer composition of claim 14.

* * * * *